United States Patent [19]

Iwasa

[11] Patent Number: 4,929,481
[45] Date of Patent: May 29, 1990

[54] WEATHER STRIP FOR AUTOMOBILE

[75] Inventor: Tadanobu Iwasa, Ichinomiya, Japan

[73] Assignee: Toyoda Gosei Co., Ltd., Nishikasugai, Japan

[21] Appl. No.: 301,400

[22] Filed: Jan. 24, 1989

[30] Foreign Application Priority Data

Mar. 2, 1988 [JP] Japan .................. 63-049235
Mar. 2, 1988 [JP] Japan .................. 63-049236

[51] Int. Cl.$^5$ .................. B60J 1/20; E06B 7/14
[52] U.S. Cl. .................. 428/36.1; 49/475; 49/485; 49/490; 49/498; 296/93; 428/31; 428/68; 428/76; 428/122; 428/195; 428/913
[58] Field of Search .............. 428/31, 122, 913, 36.1, 428/327, 68, 76, 195; 296/93; 49/490, 475, 485, 498

[56] References Cited

U.S. PATENT DOCUMENTS

| 2,055,833 | 7/1935 | Bailey | 428/122 |
| 2,594,717 | 2/1948 | Bailey | 428/122 |
| 4,603,899 | 8/1986 | Iwasa | 296/154 |
| 4,708,351 | 11/1987 | Midooka et al. | 277/184 |

FOREIGN PATENT DOCUMENTS

| 3426814 | 11/1985 | Fed. Rep. of Germany | 428/122 |
| 59-140145 | 8/1984 | Japan . | |
| 60-215674 | 9/1985 | Japan . | |

*Primary Examiner*—Ellis P. Robinson
*Assistant Examiner*—Archene A. Turner
*Attorney, Agent, or Firm*—Cushman, Darby & Cushman

[57] ABSTRACT

This invention is directed to a weather strip for use in an automobile, the main body of which is provided in the portion thereof destined to contact sheet metal parts such as a body flange or a sash with a strip of rustproofing member. The rustproofing member comprises a core, a core coating layer, and a surface layer, the core formed of a fabric impregnated with a rustproofing agent or a rustproofing material such as of a highly absorbent polymer, the core coating layer formed of a water-diffusing material, and the surface layer formed of a flexible planar material. The planar material is furnished at least on the side thereof contiguous to the metal sheet part with a water-permeating texture.

15 Claims, 2 Drawing Sheets

WEATHER STRIP FOR AUTOMOBILE

BACKGROUND OF THE INVENTION

This invention relates to a weather strip for use in an automobile, for example.

The term "weather strips" as used in the present invention means strips of material attached to the edges of such stationary window glasses as a windscreen, a rear window and quarter windows, to the joints of a hood, doors and a sun roof, and to the sliding parts between doors and door glasses in an automobile so as to protect the automobile interior against wind, rain, dust, sound, cold and heat prevailing in the ambience. The weather strips embrace window frame rubber molds (FIG. 1), door weather strips (FIGS. 2 to 6), and glass-run strips.

In the specification, the present invention will be described with reference typically to a door weather strip W1 for a trunk lid which, as illustrated in FIG. 2, comprises a flange retaining part having a U-shaped cross section containing an embedded insert 1 and provided on the interior thereof with nipping lips 3, 3 and a hollow sealing part 7 and a lip sealing part 9 protruding respectively from the top side and one lateral side of the flange retaining part 5. The door weather strips contemplated by this invention are not limited to this particular construction.

These weather strips have been heretofore manufactured generally by a procedure which comprises extrusion molding such a rubber compound as ethylene-propylene rubbers (EPDM or EPM) or chloroprene rubber (CR) into a strip in a shape having a flange retaining part 5 spread out and then injecting a sealant into the bottom part 5a of the flange retaining part 5 while the flange retaining part 5 is being laterally bent in the shape of the letter U (Japanese Patent Laid-open publication SHO No. 59(1984)-140,145). This injection of the sealant is intended to ensure the sealing function of the weather strip.

As the sealant, it has been known to use a water-swelling composition (Japanese Utility Model Laid-open publication SHO No. 62(1987)-68,850) which, for the sake of prevention of rusting, incorporates rustproofing agents disclosed in Japanese Patent Laid-open publication SHO No. 62(1987)-74,984 in combination with highly absorbent polymers.

An attempt at extrusion molding the weather strip integrally with the sealant entails four-color extrusion (solid rubber, sponge rubber, insert, and sealant) and consequently brings about a disadvantage that the extrusion molding device used therefor has a highly intricate construction.

Further, since the sealant mentioned above is formed by having highly absorbent polymers dispersed in a water-swelling composition, it does not necessarily permit rapid diffusion and absorption of water and effects prompt manifestation of the sealing property only with difficulty. Moreover, the water seeping to the bottom part 5a of the groove of the flange retaining part 5 keeps the sheet metal part (leading end of the flange part 21) in a wet state for a long time. It is inferred therefore that the persistence of this wet state offsets the effect expected to be brought about by the rustproofing agents incorporated in the water-swelling composition.

Where the water swelling composition uses as its base polymer such a nonpolar macromolecular substance as EPDM, it is suspected that the composition entail the following drawbacks in addition to the problems mentioned above.

(1) Since the highly absorbent polymers are generally polar macromolecules, it binds weakly to the base polymer which is a nonpolar macromolecule. The sealant, therefore, is liable to be rubbed and worn by the leading end of the flange part when it is exposed to the vibrations and shocks produced by the automobile during its travel, with the result that the highly absorbent polymers and the rustproofing agents as well as the base polymer lose weight and the sealant is heavily deprived of the sealing property and the rustproofing properties with elapse of time.

(2) Since the rustproofing agents are generally a polar compound, it is liable to migrate to the surface of the sealant. The rustproofing agents exuding to the surface of the sealant, on contact with water, flow out at once in a large volume. Thus, the decrease of the rustproofing effects are aggravated with elapse of time.

(3) The water-swelling composition incorporates therein surfactants for the purpose of enhancing the affinity of the base polymer for water (polar compound) and consequently facilitating the permeation of water into the water-swelling composition. Since the surfactants are disposed to flow out on contact with water, however, the water-swelling composition is gradually deprived of its affinity for water and its ability to absorb water to full depth, with the result that the absorbent polymers come to contribute only partially to the function of water absorption. Thus, the capacity of the absorbent polymers for inflation (a phenomenon contributory to the sealing action) is degraded.

(4) As the inflation of the sealant with absorbed water and the contraction thereof by drying are alternated repeatedly, the highly absorbent polymers flow out of the composition and the rustproofing agents are lost intolerably.

SUMMARY OF THE INVENTION

This invention aims to provide a weather strip safe free from the drawbacks of the prior art described above.

The present invention, in one aspect thereof, is directed to a weather strip, characterized by the fact that the main body thereof is provided in the portion thereof destined to contact such sheet metal parts as an automobile body flange and sash with a strip of rustproofing agent retaining member comprising a core, a core coating layer, and a surface layer, the core is formed of a cloth impregnated with rustproofing agents, the core coating layer is formed of a water-diffusing material, the surface layer is formed of a flexible planar material, and the planar material is furnished at least on the side thereof contiguous to the sheet metal parts with a water-permeating texture.

From the characteristic feature mentioned above, the invention derives the following operational effects.

When water seeps to the interface between the weather strip incorporating therein the rustproofing agent retaining member and the sheet metal parts, the rustproofing agent retaining member exudes the rustproofing agents they absorb the water and the sheet metal parts are infallibly protected by the exuded rustproofing agents. The leading end of the flange and other parts, therefore, do not gather rust easily.

The incorporation of the rustproofing agent retaining member (sealant) into the weather strip (provided with a flange retaining part and a hollow sealing part) has no use for the four-color extrusion (solid rubber, sponge rubber, insert, and sealant) which is indispensable to the conventional countertype. Thus, a simple construction suffices for the extrusion molding device to be used therefor. The attachment of the rustproofing agent retaining member to be effected after the work of bending can be attained with high operational efficiency.

The rustproofing agent retaining member, unlike the conventional countertype which has rustproofing agents dispersed in a resin composition, is so constructed that the seeping water reaches the rustproofing agents through the surface layer formed of a water-permeating structure and the core coating layer formed of a water-diffusing material and the rustproofing agents excude from the rustproofing agent retaining member through the water-diffusing material and the water-permeating planar material. Thus the sheet metal parts enjoy protection with the rustproofing agents for a long time.

Further, the drawbacks heretofore entailed where the rust-proofing agent retaining member has as its base polymer such a nonpolar macromolecule as EPDM are no longer present.

Specifically, (1) the rustproofing agents are not lost by friction on exposure to the vibrations and shocks generated by the automobile during its travel and (2) the rustproofing agents are not washed out at once in a large volume upon contact with water. The otherwise possible aggravation of the decrease of the rust-proofing effects with elapse of time due to loss to the rustproofing agent, therefore, can be precluded.

The present invention, in another aspect thereof, is directed to a weather strip for use in an automobile, which is characterized by the fact that the main body thereof is provided in the portions thereof designed to contact such sheet metal parts as an automobile body flange and sash with a strip of a water-inflating sealing member comprising a core, a core coating layer, and a surface layer, the core is formed of highly absorbent polymers or a material composed mainly of the highly absorbent polymers, the core coating layer is formed of a water-diffusing material, the surface layer is formed of a flexible planar material, and the planar material is furnished at least on the side thereof contiguous to the sheet metal parts with a water-permeating texture.

From the characteristic feature mentioned above, the present invention derives the following operational effects.

When water seeps to the interface between the weather strip and the sheet metal parts, the sealing member rapidly absorbs water and inflates with the absorbed water to manifest its sealing property promptly and prevent the sheet metal parts from being retained in a wet state for a long time. Thus, the leading end of the flange, for example, does not easily gather rust. Where the rustproofing agents are incorporated in the sealing member, they exude from the surface layer and lends itself to ensuring the rustproofing effects.

The incorporation of the water-inflating sealing member (sealant) into the weather strip (provided with a flange retaining part and a hollow sealing part) has no use for the four-color extrusion (solid rubber, sponge rubber, insert, and sealant) which has been indispensable to the conventional countertype. A simple construction suffices for the extrusion molding device to be used therefor. Further, the attachment of the sealing member after the bending work can be performed with high operational efficiency.

The sealing member, unlike the conventional countertype having highly absorbent polymers dispersed in a water-inflating composition, permits water to reach the highly absorbent polymers forming the core through the surface layer formed of a water-permeating texture and the core coating layer formed of a water-diffusing material and, therefore, ensures rapid diffusion and absorption of water. Thus, the conventional possibility of the incoming water keeping the sheet metal parts in a wetted state for a long time is no longer present. Thus, the sheet metal parts can be precluded from gathering rust even when no rustproofing agents are incorporated in the sealing member. Where the rustproofing agents are incorporated, the effect to be manifested thereby is not offset.

Further, the drawbacks heretofore suffered to arise when the sealant water-inflating composition has as its base polymer such a nonpolar macromolecule as EPDM are no longer present.

Specifically, (1) the highly absorbent polymer and the rust-proofing agent are not caused to lose weight on exposure to the vibrations and shocks generated by the automobile during its travel. As the result, the sealing properties and the rustproofing effects are not appreciably lowered with elapse of time.

(2) The rustproofing agents are not washed out at once in a large volume on contact with water. Thus, the decrease in the rustproofing effects with elapse of time are small.

(3) The affinity of the sealing member for water is not lowered with elapse of time. The contribution which the failure of water to reach the interior of the sealing member makes to the absorbing capacity of the highly absorbent polymers is not lowered and, as the result, the inflating action of the absorbent polymers (contributory to the sealing capacity) is not impaired.

(4) Even when the inflation with water and the contraction by drying are alternated repeatedly, the highly absorbent polymers are not suffered to flow out of the sealing member and the rust-proofing agents to be exudated intolerably.

PREFERRED EMBODIMENT OF THE INVENTION

(A)

First, the present invention will be described as embodied in a weather strip the main body of which is provided in the portion thereof destined to contact such sheet metal parts as an automobile body flange and a sash with a strip of rustproofing agent retaining member serving as a rustproofing member.

Figure 7:
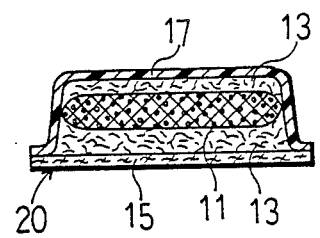
FIG. 7 is a cross section illustrating a typical sheetlike rustproofing agent retaining member to be used for the present invention.

FIG. 7 is a cross section illustrating a typical strip of rustproofing agent retaining member 20 to be used for this invention.

A core is sandwiched vertically between two folds of a core coating layer 13 and enclosed with surface layers 15, 17.

(1) Here, the core 11 is formed of fabric impregnated with rustproofing agents. The term "fabric" as used herein embraces woven fabric, felt, nonwoven fabric, and mat, for example. Among other forms of fabric mentioned above, the nonwoven fabric proves to be particularly desirable in terms of diffusibility of the rustproofing agents and water.

The fabric impregnated with the rustproofing agents is produced by impregnating a given fabric with varying rustproofing agent indicated below, when necessary, as suitably dissolved in solvents such as water. The amount of the rustproofing agents to be used for this impregnation is in the range of 0.1 to 1 g per $cm^2$ of the fabric being impregnated.

The rustproofing agents usable herein include phosphonates, aminotrismethylene phosphonic acid, 1-hydroxy-ethylidene-1,1-diphosphonic acid, organic phosphoric acid esters, aminophosphates, lignins, ligninsulfonates, polyacrylamide, 2,3-dimethyl-1-nitro-2-butene, p-aminobenzaldehyde, cinnamates, methylammonium-2,4-dinitrobenzoates, higher fatty acid salts, sodium succinate, sodium benzoacrylate, 2,3-diemthyl-1-nitro-2-butene, gluconates, n-lauroyl sarcosine, n-coco-aminopropionic acid, 4-n-hexyl catechol, 4-n-butyl catechol, hexamethylane imide nitrobenzoate, piperdine 3,5-dinitrosobenzoate, benzoates of amines, nitrites of amines, organic esters of nitrous acid, organic esters of thionitrous acid, dicyclohexyl ammonium nitrite, diisobutyl ammonium nitrite, diisopropyl ammonium nitrite, trimethyl sulfonium nitrite, cyclohexyl amine carbonates, monoethanol amine carbonates, mixtures of phosphonates with macromolecular electrolytes, calcium salts, zinc salts, magnesium salts, aluminum salts, various polyphosphates, various polysilicates, chromates, molybdenum chloride salt, tungsten oxide salts pertechnetates, and lithium hydroxide salt, for example.

(2) The core coating layer 13 is formed of a water-diffusing material. On the water entering side (the side contiguous to the sheet metal), this water-diffusing material does not permit the water seeping in spots through the surface layer 15 to advance straightly but causes it to be divided and diffused and enabled to reach the fabric impregnated with the rustproofing agent in an evenly dispersed state. It also fulfils the function of causing the rustproofing agent to be exuded gradually and evenly throughout the entire surface layer. The water-diffusing material located on the opposite side fulfils the function of absorbing the water which has escaped being absorbed by the core.

Generally, cottonlike pulp or absorbent paper is used as the water-diffusing material.

(3) The surface layers 15, 17 are produced in a flexible planar form and are provided at least on the side thereof contiguous to sheet metal parts with a water-permeating texture. Since the surface layers possess partially or wholly a water-permeating texture 15, they constitute themselves the first parts for enabling the water seeping to the bottom of the groove of the weather strip to be guided to the fabric impregnated with the rustproofing agent. When this introduction is completed, they now constitute themselves the parts for permitting exudation of the rustproofing agent.

The planar part 15 of a water-permeating texture is generally formed of porous plastic sheet, cloth, or other similar material highly pervious to water. It is not discriminated on account of the particular kind of material to be used. For the benefits of waterproofness, durability, and economy, it is desired to be formed of nonwoven fabric using polyester fibers.

The surface layer 17 which is not required to possess a water-permeating texture fulfils its function sufficiently only by possessing a flexible planar form. It is, however, desired to be thermally fusible with the aforementioned water-permeating texture in the planar form. A flexible film of polyethylene, polypropylene, or ethylene-vinyl acetate copolymer may be used advantageously.

The sheetlike rustproofing agent retaining member 20 is produced by sequentially superposing, as on a planar material of a water-permeating texture, a water-diffusing material, a fabric impregnated with a rustproofing agent, a water-diffusing material, and a flexible planar material, heat cutting the superposed layers, and thermally fusing the planar material to each other.

Figure 8:
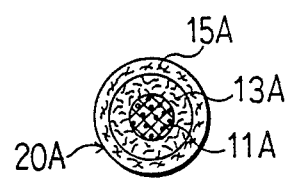
FIG. 8 is a cross section illustrating a typical cylindrical rustproofing agent retaining member similarly used.

The rustproofing agent retaining member 20A illustrated in FIG. 8 is not in the form of sheet but in the form of a cord of a circular cross section. It comprises a core 11A, a core coating layer 13A wrapped around the core 11A, and a surface layer 15A further wrapped around the core coating layer 13A. This rust-proofing agent retaining member 20A can be obtained by using a fabric impregnated with the rustproofing agents as a core and then wrapping a water-diffusing material and a flexible planar material sequentially around the core.

Now, the manner in which the rustproofing agent retaining member is put to use will be described below.

Figure 2:
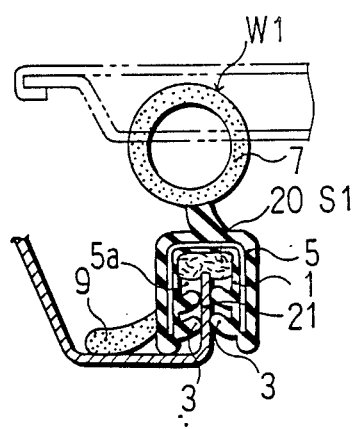
FIG. 2 is a cross section illustrating the present invention embodied in a trunk lid type weather strip.

In the case of the weather strip W1 illustrated in FIG. 2, the rustproofing agent retaining member is fitted into the bottom 5a of the groove of the flange retaining part 5. In this case, an adhesive layer formed in advance with a double-faced adhesive tape applied to the bottom 5a of the groove facilitates the attachment of the rustproofing agent retaining member to the groove even after the flange retaining part 5 is subjected to the bending work and contributes to enhancing the operational efficiency of the work involved. Otherwise, the rustproofing agent retaining member 20 may be tacked to the leading end of the automobile body flange 21 and then crowning it with the weather strip W1.

Figure 1:
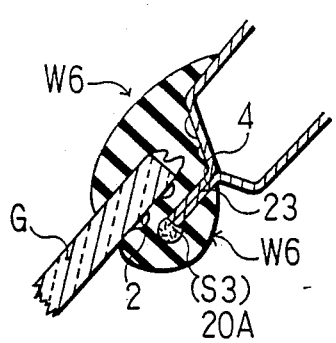
FIG. 1 is a cross section illustrating the present invention embodied in a window frame rubber molding.

The attachment of various door weather strips illustrated in FIGS. 3 to 6 and a window frame rubber mold illustrated in FIG. 1 can be attained in the same manner as described above.

Figure 3:
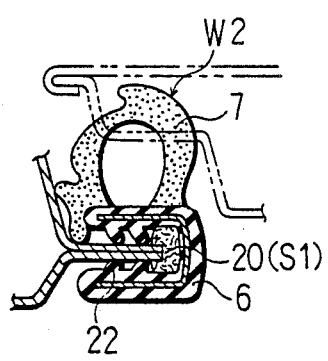
FIGS. 3 to 6 are cross section illustrating the present invention embodied in varying types of door weather strips.

A weather strip W2 illustrated in FIG. 3 comprises a U-shaped flange retaining part 6 and a hollow sealing part 8 formed on one side of the flange retaining part 6. This is of the inboard seal type designed to be attached to the automobile body flange 22. A rustproofing agent retaining member 20 is fitted fast to the bottom 6a of the groove of the flange retaining part 6.

Figure 4:
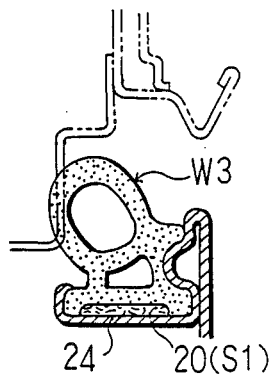

A weather strip W3 illustrated in FIG. 4 is wholly formed of a spongy material. This is of the outboard sheet type designed to be attached to a door sash 24. A rustproofing agent retaining member 20 is fitted fast to a fixing base adapted to be inserted into a door sash 24.

Figure 5:
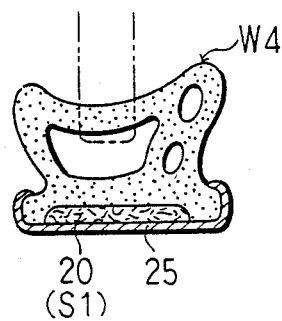

A weather strip W4 illustrated in FIG. 5 is similarly formed wholly of a sponge rubber. This is of the type intended for attachment to a roof side sash 25. A rustproofing agent retaining member 20 is joined to a fixing base adapted to be inserted into a roof side sash 25.

Figure 6:
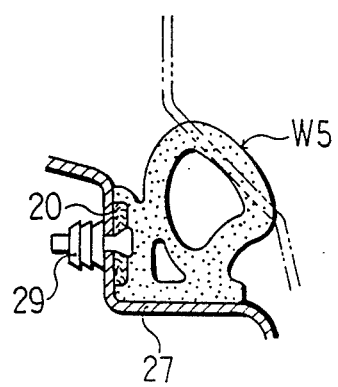

A weather strip W5 illustrated in FIG. 6 is of the type intended to be attached to a door sash 27 through the medium of a clip 29. It is to the point of attachment of this clip 29 that the rustproofing agent retaining member 20 is joined.

A window frame rubber molding W6 illustrated in FIG. 1 is so constructed as to incorporate therein a glass retaining groove 2 and a flange retaining groove 4 opening in mutually opposite directions respectively to take hold of a glass G and an automobile body flange 23. A rustproofing agent retaining member 20A in the form of a cord circular in cross section as illustrated in FIG. 1 is set fast in the bottom of the flange retaining groove 4. In this case, since the rustproofing agent retaining member 20A is in the form of a cord, it can be easily fitted fast into the bottom of the flange retaining groove 4.

When water seeps to the interface between the weather strip incorporating therein the rustproofing agent retaining member and the sheet metal parts, the sheet metal parts are infallibly protected with the rustproofing agents because the rustproofing agent retaining member exudes the rustproofing agents as they absorbs the water. Thus, the sheet metal parts such as the leading end of the flange do not easily gather rust.

(B)

Now, the present invention will be described below as embodied in a weather strip using a water-inflating sealing member as a rustproofing member.

Figure 9:
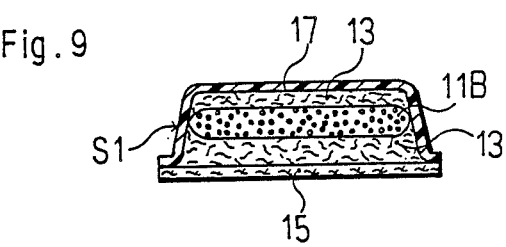
FIG. 9 is a cross section illustrating a typical strip of water-inflating sealing member to be used in the present invention.

FIG. 9 is a cross section illustrating a typical strip of water-inflating sealing member S1 to be used in the present invention.

A core 11B is sandwiched vertically by two folds of a core coating layer 13 and further enclosed with surface coating layers 15, 17.

(1) Here, the core 11B uses as its main component highly absorbent polymers. Owing to the use of the highly absorbent polymers as a main component, the core 11b inflates with the absorbed water and causes the sealing member S1 as a whole to inflate and come into intimate contact with the sheet metal parts and, consequently, contributes to the manifestation of the sealing action by the sealing member s1.

The highly absorbent polymers usuable herein include polyacrylates (e.g. polysodium and polypotassium acrylates), polyvinyl alcohol-cyclic anhydride graft copolymers, isobutylene-maleic acid copolymers, starch-polyacrylate graft copolymers, vinyl acetateacrylate copolymers, vinyl acetate-unsaturated carboxylic acid copolymers, polyethylene oxide type polymers, carboxymethyl cellulose type polymers (e.g. sodium carboxymethyl cellulose), and starch-polyacrylonitrile graft copolymers, for example. The highly absorbent polymer is generally used in the form of fine beads or granules. Optionally, a nonwoven fabric first impregnated with a solution of the highly absorbent polymer and then dried to gel the solution (e.g. a product of Kuraray Isoprene Chemical K.K. marketed under trademark designation of "KI Gel Sheet"), polyacrylate type fibers (e.g. product of Nihon Exlan K.K. marketed under trademark designation of "Ran Seal"), or a cloth made of the polyacrylate type fibers may be used instead.

The core 11B needs not to be formed solely of the aforementioned highly absorbent polymers. It may be formed of a mixture of two or more highly absorbent polymers. Optionally, it may be admixed with a water-diffusing material forming the core coating layer 13 or rustproofing agents.

When the core 11B is mixed with the water-diffusing material, it brings about an effect of accelerating the diffusion of water in the entirety of the core. When the core is mixed with the rustproofing agents it further ensures the rustproofing action aimed at by the present invention. The amount of the rustproofing agents to be used for this mixture generally falls in the range of 5 to 300 parts, based on 100 parts of the highly absorbent polymers. Any of the concrete examples of rustproofing agents mentioned in (A) above may be used herein.

(2) The core coating layer 13 is formed of the same water-diffusing material as mentioned in (A) above. On the water entering side (the side contiguous to the sheet metal), this water-diffusing material does not permit the water seeping in spots through the surface layer 15 to advance straightly but causes it to be divided and diffused and enabled to reach the entirety of the highly absorbent polymers with the rustproofing agents in an evenly dispersed state. It also fulfils the function of causing the highly absorbent polymers to contribute wholly to the absorbing action and to the enhancement of the absorbing efficiency. The water-diffusing material located on the opposite side fulfils the function of absorbing the water which has escaped being caught by the highly absorbent polymers and, at the same time, effecting gradual extraction of the absorbed water.

(3) The surface layers 15, 17 are produced in a flexible planar form in the same manner as in (A) above and are provided at least on the side thereof contiguous to sheet metal parts with a water-permeating texture. Their functions are similar to those described in (A) above. Since the surface layers possess partially or wholly a water-permeating texture, they constitute themselves the first parts for enabling the water seeping to the bottom of the groove of the weather strip to be guided to the highly absorbent polymers. When this introduction is completed, they now constitute themselves the parts for inhibiting contact between the water absorbed in the water-diffusing material and the highly absorbent polymers and the sheet metal parts (flange) 21.

The sheetlike sealing member S1 is produced by sequentially superposing, as on a planar material of a water-permeating structure, a water-diffusing material, highly absorbent polymers a water-diffusing material, a water-diffusing material, and a flexible planar part, heat cutting the superposed layers, and thermally fusing the planar materials to each other.

Figure 10:
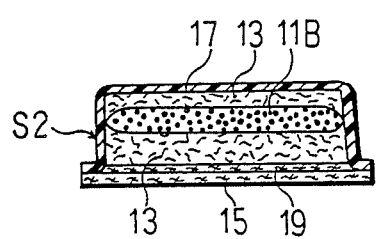
FIG. 10 is a cross section illustrating a typical sheetlike sealing member to be used similarly.

The weather strip illustrated in FIG. 10 is equivalent to that illustrated in FIG. 9, excepting a sealing member S2 has a rustproofing agent carrier layer 19 interposed between a surface layer 15 continuous to the metal sheet part and a core coating layer 13. When the aforementioned nonwoven fabric is used as the carrier, the rustproofing agents are enabled to act stably on the sheet metal for a long time because the rustproofing agents are exuded efficiently and gradually through the surface layer.

Figure 11:
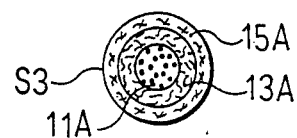
FIG. 11 is a cross section illustrating a typical cylindrical sealing member to be used similarly.

The sealing member S3 illustrated in FIG. 11 is not in the form of a sheet but in the form of a cylinder circular in cross section. A core coating layer 13A is wrapped around the core 11B and a surface layer 15A is further wrapped around the core coating layer 13A. This sealing member S3 is produced by rolling the component members sequentially, starting with the core 11A where the core is made of a material possessing a definite shape. Where the core is made of a material which, like powders, lacks a definite shape, the sealing member S3 is produced by first rolling the core coating layer 13A and the surface layer 15A into an integral tube, closing the tube at one end, injecting the powdery material into the cavity of the tube, and closing the remaining end of the tube.

The sealing member produced as described above is put to use in the same manner as described above.

When the weather strip incorporating the sealing member suffers water to seep into the interface between the weather strip and the sheet metal part, the sheet metal part is not allowed to remain in a wetted state for a long time because the sealing member promptly absorbs the incoming water and inflates with the absorbed water to manifest the sealing properties immediately. Thus, the leading end of the flange does not easily gather rust. Where the sealing member incorporates rustproofing agents therein, it exudes the rustproofing agents through the surface layer and further ensures the rustproofing effects.

What is claimed is:

1. A weather strip for use in an automobile, characterized by the fact that the main body thereof is provided in the portion thereof destined to contact such sheet metal parts as a body flange and a sash with a strip of rustproofing agent retaining member comprising a core, a core coating layer, and a surface layer, said core is formed of a fabric impregnated with rustproofing agents, the amount of said rustproofing agents is in the range of 0.1 to 1 g per cm$^2$ of the fabric being impregnated, said core coating layer is formed of a water-diffusing material, and said surface layer is formed with a flexible planar material, and said planar material is furnished at least on the side thereof contiguous to said sheet metal parts with a water-permeating texture.

2. A weather strip according to claim 1, wherein said fabric impregnated with said rustproofing agents is a nonwoven fabric.

3. A weather strip according to claim 1, wherein said water-diffusing material is a cottonlike pulp or an absorbent paper.

4. A weather strip according to claim 1, wherein said water-permeating texture is a non-woven fabric.

5. A weather strip according to claim 1, wherein said rustproofing agent retaining member is in the form of a sheet.

6. A weather strip according to claim 1, wherein said rustproofing agent retaining member is in the form of a cylinder.

7. A weather strip for use in an automobile, which is characterized by the fact that the main body thereof is provided in the portions thereof designed to contact such sheet metal parts as a body flange and a sash with a strip of a water-inflating sealing member comprising a core, a core coating layer, and a surface layer, said core is formed of highly absorbent polymers or a material composed mainly of said highly absorbent polymers said core coating layer is formed of a water-diffusing material, said surface layer is formed of a flexible planar material, and said planar material is furnished at least on the side thereof contiguous to said sheet metal parts with a water-permeating texture.

8. A weather strip according to claim 7, wherein said highly absorbent polymers are in the form of minute beads or granules.

9. A weather strip according to claim 7, wherein said highly absorbent polymers are in a form obtained by impregnating a nonwoven fabric with melted polymer and drying the wet fabric thereby geling the polymer.

10. A weather strip according to claim 7, wherein said highly absorbent polymer is in the form of highly absorbent polymer fibers or in a form obtained by weaving or knitting said fibers into a fabric.

11. A weather strip according to claim 7, wherein said water-diffusing material is a cottonlike pulp or an absorbent paper.

12. A weather strip according to claim 7, wherein said water-permeating texture is a nonwoven fabric.

13. A weather strip according to claim 7, wherein said water-inflating sealing member is in the form of a sheet.

14. A weather strip according to claim 13, wherein a rust-proofing agent carrier layer is interposed between a surface layer contiguous said sheet metal and a core coating layer.

15. A weather strip according to claim 7, wherein said water-inflating sealing member is in a cylindrical form.

* * * * *